(12) United States Patent
Mirowsky et al.

(10) Patent No.: US 6,668,563 B2
(45) Date of Patent: Dec. 30, 2003

(54) AIR TREATMENT SYSTEM FOR AIRPLANES

(76) Inventors: Bernard J. Mirowsky, 34 Dunkard Church Rd., Ringoes, NJ (US) 08551; Paul D. Mirowsky, 231 N. Union St., Lambertville, NJ (US) 08530

( * ) Notice: Subject to any disclaimer, the term of this patent is extended or adjusted under 35 U.S.C. 154(b) by 0 days.

(21) Appl. No.: 10/071,623

(22) Filed: Feb. 9, 2002

(65) Prior Publication Data

US 2003/0150222 A1 Aug. 14, 2003

(51) Int. Cl.[7] .............. F24F 3/16; F25D 23/00; H05B 37/00; H01T 23/00
(52) U.S. Cl. .............. 62/78; 62/264; 361/231; 315/119.1
(58) Field of Search .............. 62/78, 264; 361/231, 361/230; 315/111.91, 111.01; 313/62; 250/230

(56) References Cited

U.S. PATENT DOCUMENTS

| | | | | |
|---|---|---|---|---|
| 1,839,876 A | * | 1/1932 | Hartman | 422/186.18 |
| 2,920,622 A | * | 1/1960 | Steel | 128/202.25 |
| 3,201,620 A | * | 8/1965 | Ballentine | 310/310 |
| 3,403,252 A | * | 9/1968 | Nagy | 250/432 R |
| 3,422,263 A | * | 1/1969 | Asahina | 250/435 |
| 4,037,268 A | * | 7/1977 | Gallagher | 361/231 |
| 4,244,712 A | * | 1/1981 | Tongret | 422/121 |
| 4,406,322 A | | 9/1983 | Rossi et al. | |
| 4,493,247 A | * | 1/1985 | Wachsman | 454/76 |
| 4,967,565 A | | 11/1990 | Thomson et al. | |
| 4,980,796 A | * | 12/1990 | Huggins | 361/231 |
| 5,086,622 A | * | 2/1992 | Warner | 62/172 |
| 5,136,461 A | * | 8/1992 | Zellweger | 361/231 |
| 5,381,789 A | * | 1/1995 | Marquardt | 128/202.25 |
| 5,433,772 A | * | 7/1995 | Sikora | 96/87 |
| 5,468,454 A | * | 11/1995 | Kim | 422/120 |
| 5,501,844 A | | 3/1996 | Kasting, Jr. et al. | |
| 5,913,809 A | | 6/1999 | Erlichman et al. | |
| 6,071,418 A | | 6/2000 | Tai | |
| 6,199,387 B1 | | 3/2001 | Sauterleute | |
| 6,432,367 B1 | * | 8/2002 | Munk | 422/108 |

* cited by examiner

*Primary Examiner*—William C. Doerrler
(74) *Attorney, Agent, or Firm*—Kenneth P. Glynn, Esq.; Deirdra M. Meagher, Esq.

(57) ABSTRACT

The present invention is an air treatment system for airplanes. It includes: (a.) an environmental conditioning system located within an airplane to provide at least one of heating, cooling, and compressing air, and has ingress ductwork to remove air from an airplane cabin into the system, and an air movement mechanism, e.g. blowers, or equivalent devices, to cycle the air from the cabin and into the environmental conditioning system via the ingress ductwork. It also has egress ductwork for return of treated air into the cabin; and, (b.) an ionic oxygen generator connected to one or both of the ingress ductwork and the egress ductwork. The ionic oxygen generator may be one or more, and should be of sufficient capacity to generate at least 200 ions of ionic oxygen per cubic centimeter of incoming air for removal of airborne contaminants and odor from exiting air before it is returned to the cabin. Other embodiments are separate from the plane's environmental conditioning system and utilizes one or more ionic oxygenerators to treat airplane air separatly.

20 Claims, 5 Drawing Sheets

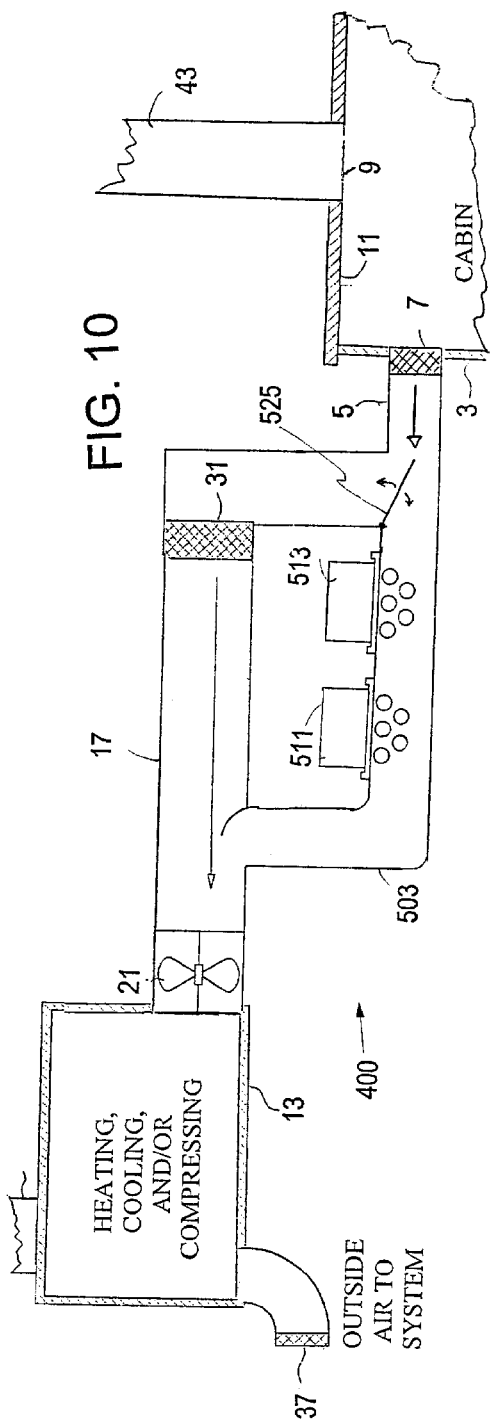
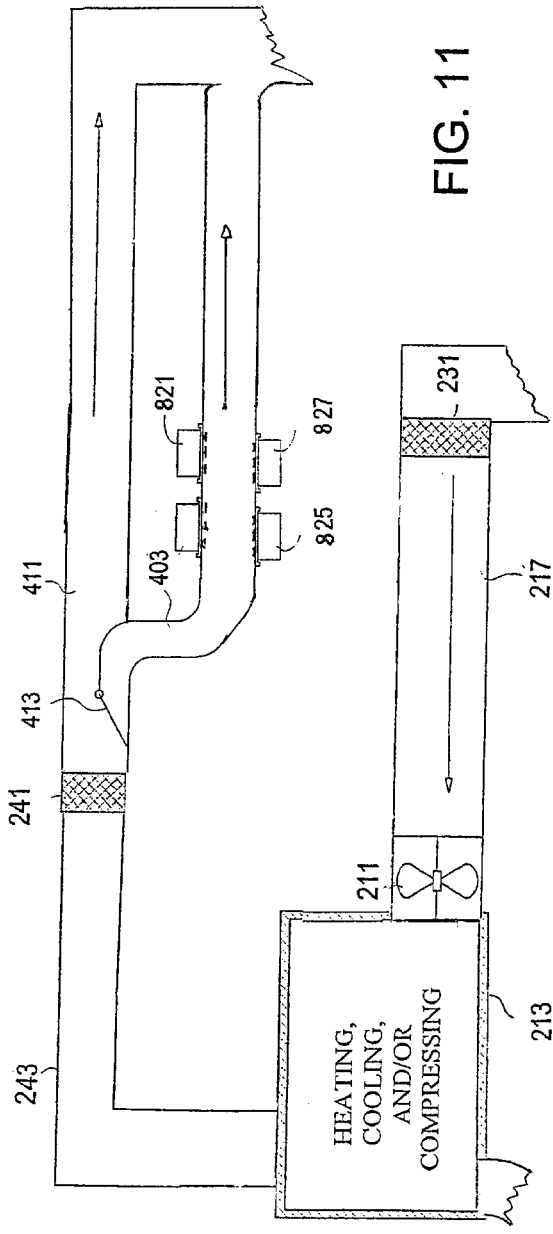

AIR TREATMENT SYSTEM FOR AIRPLANES

BACKGROUND OF THE INVENTION

1. Field of the Invention

The present invention is directed to air treatment systems for airplanes to eliminate or substantially reduce airborne contaminant and odor problems, including ozone reduction. More specifically, the present invention systems are air treatment systems for closed airplane environments having air treatment systems (also referred to as environmental conditioning systems) which include ionic oxygen generation and treatment of undesired airborne contaminants and odors with the generated ionic oxygen.

2. Information Disclosure Statement

The following United States patents are of interest in that some illustrate known airplane air treatment systems, while others illustrate treatment methods and/or ozone generation, although the present invention does not rely upon ozone generation, but instead relies upon ionic oxygen generation:

U.S. Pat. No. 6,199,387 describes an air-conditioning system in particular for aircraft wherein pressurized, moisture-containing air is conditioned for air-conditioning the cabin. The pressurized air is compressed further in two separate stages, dehumidified in a high-pressure water extraction cycle and subsequently expanded in one or two turbine stages. Depending on the design one can thereby achieve ice-free conditioned air or a high efficiency of the air-conditioning system, in particular if two turbine stages are provided and the energy gained in the particular turbine stages is utilized regeneratively, distributed over the compressor stages.

U.S. Pat. No. 6,071,418 describes a method and system for wastewater treatment which describes and is particularly suitable for manure lagoons and pits. Specifically, an ozone gas is homogeneously distributed through an upper stratum of a contained liquid thereby creating an aerobic "cap", while still maintaining an anaerobic lower stratum. A perforated tube or plurality of tubes fixed within the upper stratum serves to distribute the ozone. Alternately, a buoyant vehicle propelled across the surface of the liquid may also serve to distribute the ozone and create the ozonated "cap". The vehicle provides an additional benefit of crust fragmentation and prevention thereby inhibiting and eliminating fly propagation, and hygienically improving lagoon or pit operation. In either embodiment, the ability to create an aerobic and anaerobic balance within the liquid facilitates a reduction in odor, a significant improvement of organic digestion and solids control, and a reduction in pathogens sometimes found in water recycled from the containment area.

U.S. Pat. No. 5,913,809 describes an ionization field which is produced across the pumped air flow to a fuel combustion process to increase the content of oxygen in the stream, and the stream reactivity. This ionization field may be produced between a sharp electrode and a grid or sheet, positioned in a shielded structure like the filter housing on the engine intake. Alternatively, an ultraviolet light source may be used to ionize the oxygen in the air stream. If either form the air stream may be compressed before its ionization and then may be injected into the exhaust products of the combustion process. The ionization power may be modulated along with the demand. Thus the throttle position may be sensed to modulate the voltage multiplier levels across the electrodes straddling the air stream, in accordance with the demand.

U.S. Pat. No. 5,501,844 describes an air treating apparatus which is a method therefore is disclosed that can be used in spaces occupied by humans or other mammals for deodorizing the air with ozone while the humans or other mammals are present. A housing having an air inlet and an air outlet defining an air flow passageway therebetween has a fan in the inlet for drawing air through the passageway and discharging the air through the outlet. The housing contains a transformer for supplying high voltage electrical power to an ozone generator in the air passageway for enriching the air in ozone and discharging a mixture of ozone in the air at a predetermined concentration. A potentiometer controls a timer for controlling the interval over which ozone is produced in an "on/off" manner. The time averaged concentration of ozone thereby is controlled so that exposure to ozone does not exceed established limits over time.

U.S. Pat. No. 5,086,622 describes in an air cycle environmental control system, a condenser removes water vapor from compressed, ambient, supply air before it is expanded in a first turbine. The chilled outlet air from the first turbine is then used as a coolant in the condenser, absorbing there the heat of vaporization of the condensed water vapor. After passing through the condenser, the warmed coolant in then expanded in a second turbine. Should the pressure of the supply air fall below predetermined levels, portions of the cycle that degrade performance or become unnecessary are bypassed.

U.S. Pat. No. 4,967,565 describes an advanced Environmental Control System (ECS) for use in conjunction with a turbine engine to provide conditioned, pressurized air to an enclosed space such as an aircraft cabin, as well as cooling capacity for the aircraft avionics. The ECS features a dual turbine air cycle machine to minimize the amount of bleed air or power required from the turbine engine.

U.S. Pat. No. 4,406,322 describes in a heating and/or cooling system, two heated transmitting media are blended into a blended medium with adjustable temperature. The motor of a blending member is controlled pulsewise in both directions by comparison pulses from a setpoint/actual value temperature comparison. In order to provide a system which is simple to construct, which is wear-resistant and which permits a quick and accurate adjustment of the blending member, the circuit arrangement for controlling the motor contains a first pulse generator, which generates pulses of constant width commencing respectively with the end of a comparison pulse and is connected to second and third pulse generators generate pulses of width proportional to the actual value or the set-point of the temperature, respectively, which directly control the motor after comparison in a comparator. The blending member is advantageously the blend door for air supply into a motor vehicle or a mixing valve for liquid media.

Thus, notwithstanding the prior art, the present invention system is neither taught nor rendered obvious thereby.

SUMMARY OF THE INVENTION

The present invention is an air treatment system for airplanes. It includes:

(a.) an environmental conditioning system located within an airplane to provide at least one conditioning treatment selected from the group consisting of heating, cooling, and compressing air, and having ingress ductwork to remove air from a cabin of the airplane and into the environmental conditioning system and having air movement mechanism(s), such as blowers, fans or equivalent devices, contained within the environmental conditioning system to remove air from the cabin and into the environmental conditioning system via the ingress ductwork, and having at least one conditioning mechanism to provide at least one conditioning treatment selected from the group consisting of heating, cooling and compressing air, and having egress ductwork connected thereto for return of treated air into the cabin;

(b.) an ionic oxygen generator connected to either or both of the ingress ductwork and the egress ductwork. The ionic oxygen generator may be one or more, and should be of sufficient capacity to generate at least 200 ions of ionic oxygen per cubic centimeter of incoming air for removal of airborne contaminants and odor from exiting air before it is returned to the cabin.

By "ductwork" is meant any conduit through which air is intended to flow, e.g., tubing, passageways, piping, sheet metal ducts, and equivalent conduiting arrangements. By "ingress ductwork" is meant ductwork which is upstream from any environmental conditioning component; by "egress ductwork" is meant ductwork which is downstream from any environmental conditioning component. Taken together, they are intended to encompass all ductwork in a system, so that whatever component is used to determine ingress is also used to determine egress ductwork.

In some embodiments, the ingress ductwork may include an ingress channel of ductwork from an outside environment exterior of the airplane into the airplane for supplying additional oxygen to the cabin. The ingress ductwork and/or the egress ductwork may include at least one air blower connected thereto.

In some embodiments, the ionic oxygen generator is located within the egress ductwork.

In other embodiments, there is a bypass channel connected to the egress ductwork and there is a valving mechanism adapted to control the flow of air into the bypass channel to thereby control ionic oxygen flow into the air to thereby controllably treat airborne contaminants and odors in treated air before it is released to the cabin. In general, ionized oxygen also continues to be active within the cabin itself to further treat the air.

In other embodiments, the ionic oxygen generator is located within the ingress ductwork.

In yet other embodiments, there is a bypass channel connected to the ingress ductwork and there is a valving mechanism adapted to control the flow of air into the bypass channel to thereby control ionic oxygen flow into the air to thereby controllably treat airborne contaminants and odors in treated air before it is released to the cabin.

In most preferred embodiments, the present invention air treatment system for airplanes includes at least one ionic oxygen generator connected to either or both of the ingress ductwork and the egress ductwork, having at least a power generator and one or more ionization creating components selected from the group consisting of elongated cylindrical ionization tubes, flat ionization discs, and combinations thereof. As stated above, the ionic oxygen continues to be active within the cabin environment.

In some embodiments of the present invention, the air treatment system for airplanes is independent of the existing heating, air conditioning and pressurization mechanisms, and one or more units are individually installed with a blower, fan or the like, recirculating the air in selected locations on the plane, e.g., in former luggage areas which have been modified with venting. These embodiments essentially include:

(a.) an air treatment system located within an airplane, which incudes at least one air circulation mechanism to move air within the airplane past at least one ionic oxygen generator; and, (b.) at least one ionic oxygen generator physically located within the airplane and sufficiently near the one air circulation mechanism to have air move past the ionic oxygen generator. The ionic oxygen generator is of sufficient capacity to generate at least 200 ions of ionic oxygen per cubic centimeter of incoming air for removal of airborne contaminants and odor from existing air in the airplane. The ionic oxygen generator has at least a power generator and one or more ionization creating components, e.g., one or more individual flat ionization discs, one or more elongated cylindrical ionization tubes, or combinations thereof.

BRIEF DESCRIPTION OF THE DRAWINGS

The present invention should be more fully understood when the specification herein is taken in conjunction with the drawings appended hereto wherein:

FIGS. 10 and 11 show present invention alternative embodiment systems with ionic oxygen treatment in ingress and egress bypass channels respectively;

DETAILED DESCRIPTION OF THE PRESENT INVENTION

Figure 1:
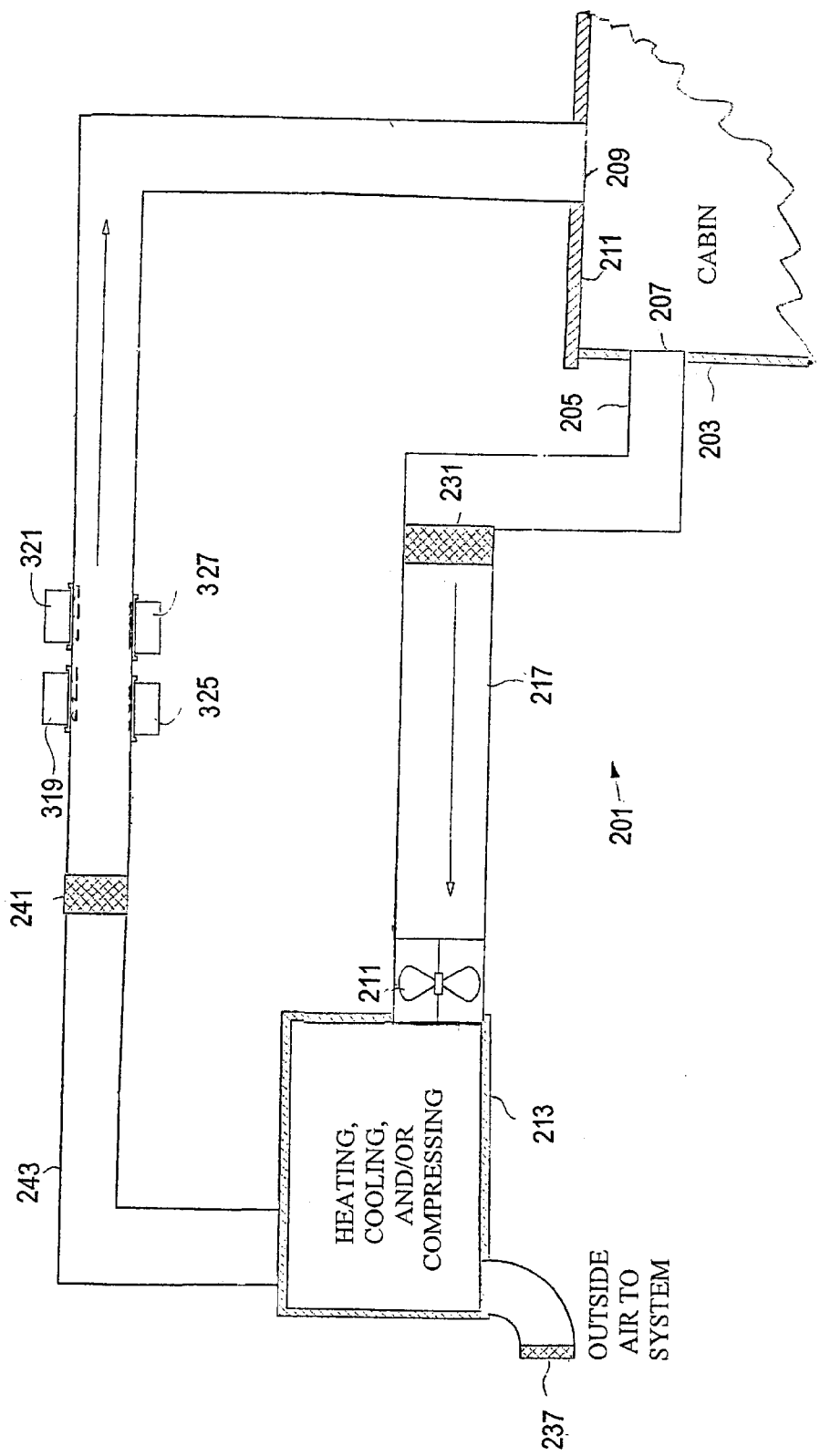
FIG. 1 illustrates a diagrammatic view of one embodiment of the present invention air treatment system for airplanes.

The present invention is shown in a first, preferred embodiment air treatment system for airplanes in FIG. 1. The present invention system 201 is described relative to airplane cabin 203.

Cabin 203 has a vent 207 connected to ingress ductwork 205, which removes air from cabin 203 via blowers or fan(s) 21 into the heating, cooling and/or pressurization component 213. After the intake air is conditioned at component 213, it is returned to the cabin 203 via egress ductwork 243 and vent 209 in cabin ceiling 211. There is an optional, but sometimes necessary, outside air intake 237, described above in conjunction with intake 37 of FIG. 9, for supplementing internally circulated air.

Ingress ductwork 205 includes one or more filters 31 and egress ductwork 243 includes filter 241. As the air travels from component 213 through egress ductwork 243, a plurality of ionic oxygen generators 319, 321, 323, and 325 are included, as shown. These may be arranged in different positions within the ductwork and this is elaborated upon in conjunction with Figures discussed above. As shown, these generators 319, 321, 323, and 325 are downstream from filters 231 and 241 so that the air is well filtered before ionized. This is preferred so that maximum odor destruction is achieved with the available ionic oxygen generated. With this arrangement, strong bathroom odors, food odors, stale air and other smells and airborne annoyances are substantially reduced or eliminated.

Figure 2:
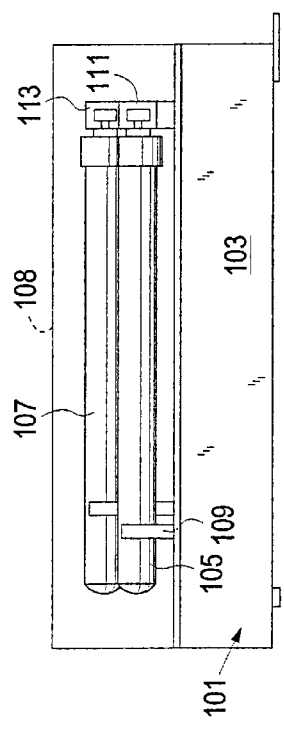
FIGS. 2, 3 and 4 show side, left end and right end views of one present invention system ionic oxygen generator with a plurality of plasma tubes for placement in a present invention airplane air treatment system.
Figure 3:
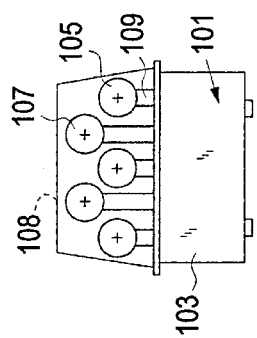
Figure 4:
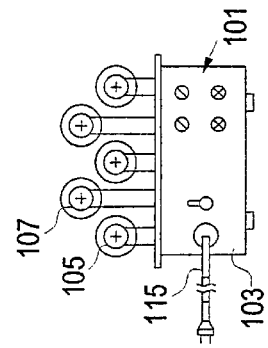

FIG. 2 shows a side view, FIG. 3 shows a left end view, and FIG. 4 shows a right end view of one type of a present invention system ionic oxygen generator 101. Ionic oxygen generator 101 contains a plurality of individual ionization tubes such a tubes 105 and 107. They have supports such as support 109 along with connectors such as connectors 111 and 113 which elevate the tubes so as to provide 360 degree exposure to the atmosphere. The power generator is contained within housing 103 to operate on 110/220 volts alternating current at a power consumption based on the number of tubes and the size of the tubes. For example, in this case, using five tubes, the consumption would be at about 40 watts. Ionic oxygen generator 101 and similar devices are specifically designed to create measurable and controllable quantity of negative and positive ions. These activate the oxygen molecules in the air with uneven polarity and form clusters of 15 to 60 molecules which raise the airs electrical potential. This enables the generated ionic oxygen to oxidize odorous volatile gases and also reduce ozone. Thus, odors, especially of organic origin such as food odors, and human waste, are quickly eliminated. In addition to odors of organic origin and inorganic gases generated therefrom, such as hydrogen sulfide and other sulfur byproducts, the ionic oxygen clusters generated within the present invention system may reduce or eliminate other airborne contaminants. Such contaminants include, but are not limited to, acetylaldehyde, acrylic acid, ammonia, aniline, benzene, carbon monoxide, diethylamine, ethylacrylate, formaldehyde, furfuraldehyde, kresol, methylamine, phenol, sulfur dioxide, sulfur carbon, toluol, vinegar acid, xylol and many other odorous gases.

These ionic oxygen generators are reactive plasma generators which produce ionic oxygen instead of ozone at a rate of over 100,000 ions per cubic centimeter when measured one centimeter from the tube surface. These ionic oxygen generators reduce ozone levels from 300% in excess of the United States Protection Agency standards by 300% down to no detectable ozone, in dragger tube airline tests. Thus, the present invention system is not an ozone generation system, but an ozone reduction system.

Figure 5:
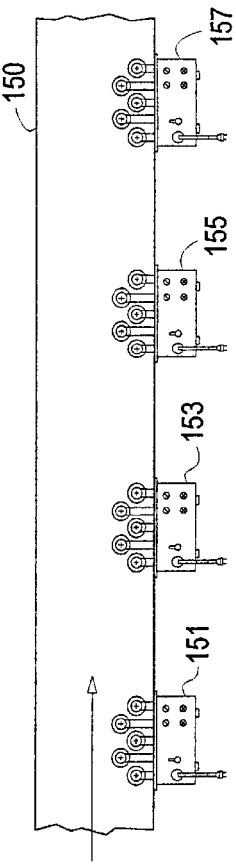

FIG. 5 shows a top cut front view of one possible unit arrangement in ductwork 120. It shows the orientation and position of staggered ionic oxygen generator units 121 and 123 on each side.

Figure 6:
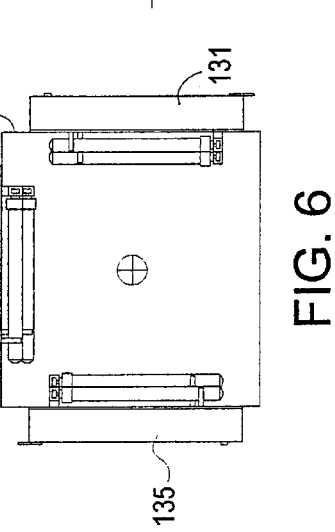

FIG. 6 shows a cut end view of ductwork plenum box 130 with ionic oxygen generator units 131, 133 and 135 arranged on the sides and top for a horizontal flow configuration.

Figure 7:
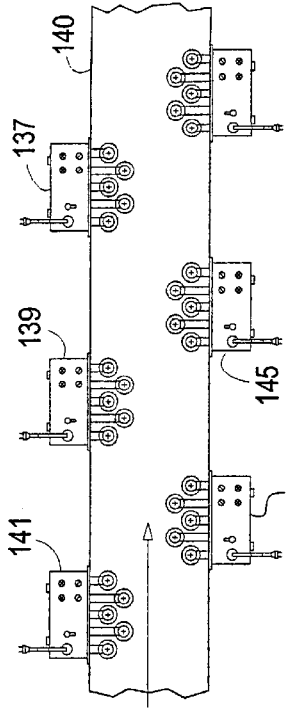
FIGS. 5, 6, 7 and 8 show various ductwork and ionic oxygen generator arrangements which may be used in present invention systems.
Figure 8:
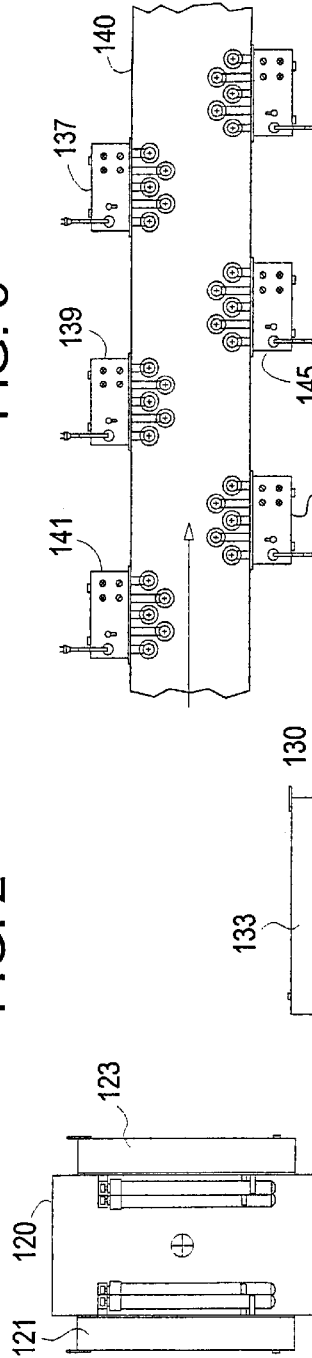

FIG. 7 shows a side cut view of horizontal duckwork 140 with a plurality of ionic oxygen generators arranged in staggered, opposing positions. Thus, typical are ionic oxygen generator units 137, 139 and 141 located in the top, and units 143 and 145 located in the bottom. An alternative arrangement would be to have the generators located on the sides or only on the top or bottom. FIG. 8 shows ionic oxygen generators 151, 153, 155 and 157 located in the bottom of tubing ductwork 150. An alternative to the above arrangements would be to have the tubes situated parallel to the flow of air rather than at right angles. Other angles could also be used.

Figure 9:
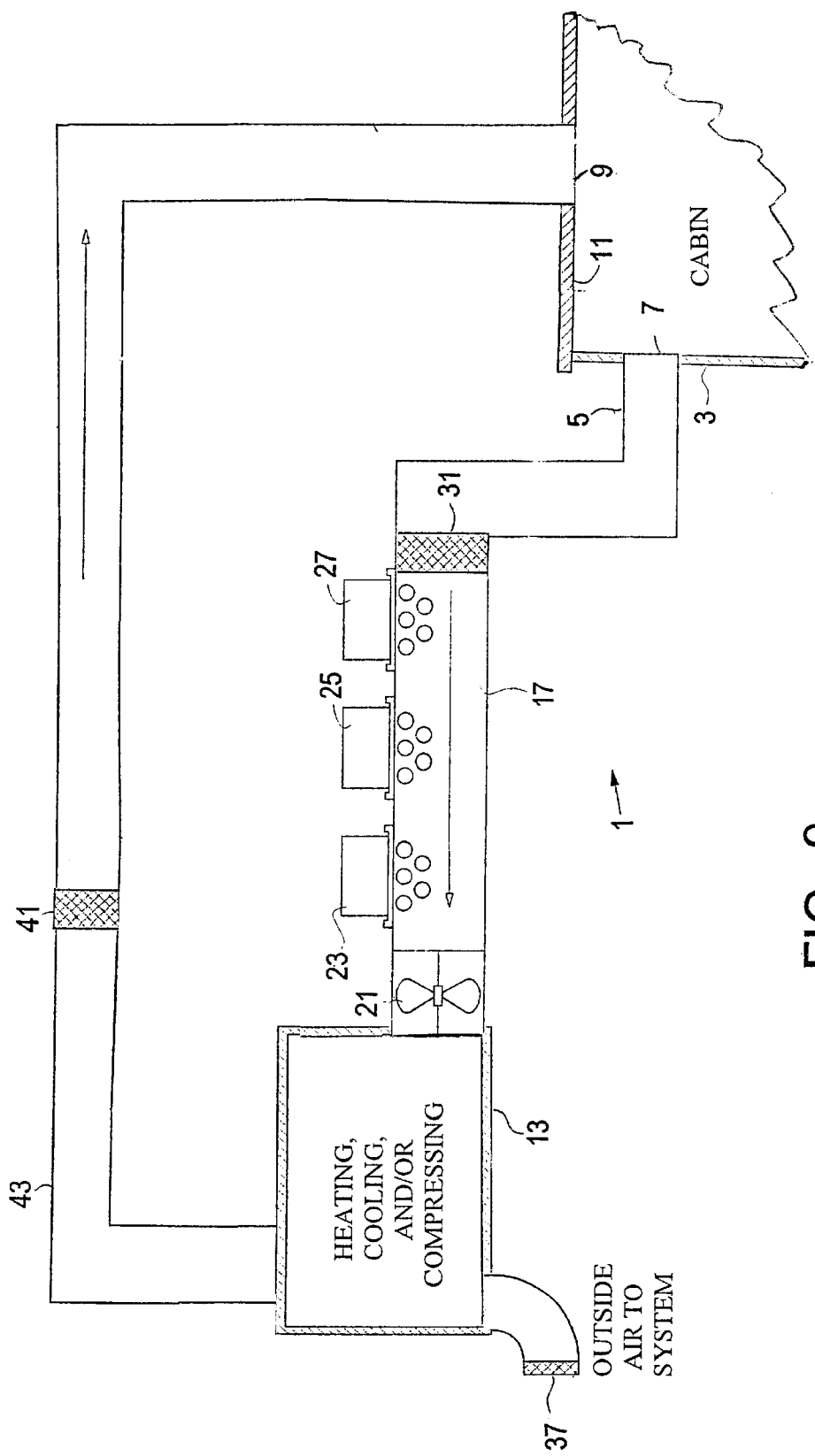
FIG. 9 illustrates a present invention system which includes ingress duct ionic oxygen treatment.
Figure 14:
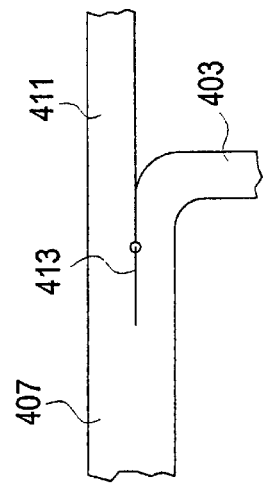
FIGS. 12, 13, and 14 illustrate a present invention system with an external bypass channel and valving options, wherein the Figures show different valve positions; and, FIG. 15 shows a present invention system which is a system for use in an airplane separate from the main heating/cooling/pressurization system of an airplane.
Figure 13:
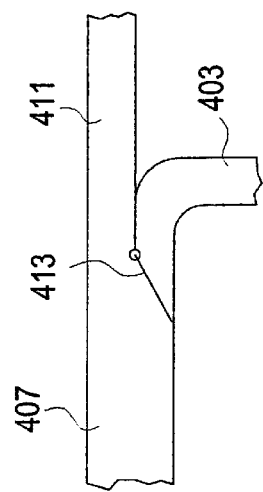

The present invention is shown in an alternative embodiment in FIG. 9, wherein another embodiment air treatment system for airplanes is shown. The present invention system 1 relates to and is in place in an airplane and, hence, is illustrated relative to cabin 3. (The Figures herein do not show the outside of the plane and the drawings should be taken to mean that everything shown therein is inside an airplane.) Cabin 3 has a vent 7 connected to ingress ductwork 5, which removes air from cabin 3 via fan(s) 21 into the central heart of the environmental conditioning system, that is, the heating, cooling and/or pressurization component(s) 13. After the intake air is conditioned at component(s) 13, it is returned to the cabin 3 via egress ductwork 43, via vent 9 in cabin ceiling 11. There is an optional, but sometimes necessary, outside air intake 37 for supplementing internally circulated air. The details of this feature are known in the airline industry and do no change as to the context of the overall present invention system. In this embodiment, ingress ductwork 5 includes one or more filters 31 and, as the air travels from cabin 3 to component(s) 13, a plurality of ionic oxygen generators 23, 25, and 25 are included, as shown. These may be arranged in different positions within the ductwork and this is elaborated upon in conjunction with Figures discussed above. As shown, these generators 23, 25, and 25 are downstream from filters 31 so that the incoming are is filtered before ionized. While this is not necessary, it is preferred so that maximum odor destruction is achieved with the available ionic oxygen generated. Filter 41 is also included in egress ductwork 43 to further enhance filtration of the treated and conditioned air before it is returned to cabin 3. By the present invention system, strong bathroom odors, food odors, stale air and other smells and airborne annoyances are substantially eliminated.

FIG. 10 shows another present system wherein the system is similar to that shown in FIG. 9, except that the ionic oxygen generators are located in an ingress channel bypass 503. Elements shown here and in FIG. 1 are numbered identically. In this embodiment, bypass 503 includes ionic oxygen generator units 511 and 513, and, at its entrance, has a valving mechanism 525 to control flow of air intake to travel through both the bypass 503 and the ingress ductwork 17 simultaneously at a controlled ratio, or to flow through only one or the other of these. Valving mechanism 525 could be manually controlled, but is preferably controlled by instrumentation automatically. Ionic oxygen generation could, alternatively, or additionally, be controlled automatically.

FIG. 11 shows another present system wherein the system is similar to that shown in FIG. 9, except that there is an egress bypass channel 403 which contains the ionic oxygen generator units such as units 821, 825, and 827. There is also a valving mechanism 413 for flow control similarly to that described in conjunction with FIG. 10 above and as elaborated upon more fully below. The elements that are common to both FIGS. 9 and 11 are identically numbered.

Figure 12:
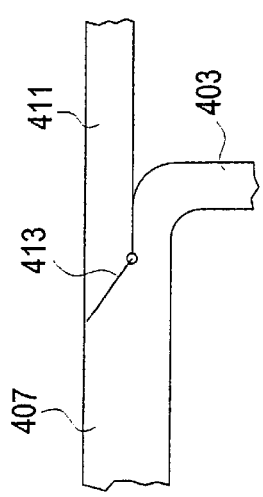

Valving mechanism 413 controls air flow in the system and reference is made to FIGS. 11, 12, 13 and 14 taken together, wherein identical parts are identically numbered. When the valve flap is up, as shown in FIG. 12, air flows only to the ionic oxygen generators. When it is down, as in FIG. 13, air flows only through the egress ductwork and not to the ionic oxygen generators. When it is in the middle position shown in FIG. 14, air flows into both areas as shown.

Figure 15:
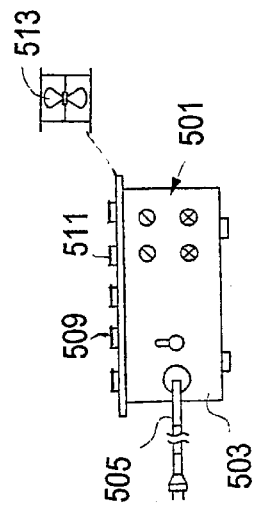

FIG. 15 shows a present invention alternative embodiment air treatment system which is not a part of the central environmental control system of an aircraft. Instead, ionic oxygen generator unit 501 may be installed in any useful location within the aircraft to purify the surrounding air. For example, units may be placed every ten feet or so apart and operate similarly to but independent of one another. These units include a power generator 503, connection to an electricity source 505, a plurality of flat disc ionizers a, such as discs 509 and 511, and a nearby fan or blower 513 to circulate air past the discs. While a plurality of discs is shown, the unit could be a smaller model with a single disc. Likewise as to any embodiment described anywhere herein, the ionizers need not be disc, but could be tubes or any other workable geometry, without exceeding the scope of the present invention.

Obviously, numerous modifications and variations of the present invention are possible in light of the above teachings. For example, the units may be connected to the power system of the airplane or may have one or more independent power sources, although it is preferred to utilize existing airplane power sources. It is, therefore, understood that within the scope of the appended claims, the invention may be practiced otherwise than as specifically described herein.

What is claimed is:

1. An air treatment system for airplanes, which comprises:
    (a.) an environmental conditioning system located within an airplane to provide at least one conditioning treatment selected from the group consisting of heating, cooling, and compressing air, and having ingress ductwork to remove air from a cabin of said airplane and into said environmental conditioning system and having air movement means contained within said environmental conditioning system to remove air from said cabin and into said environmental conditioning system via said ingress ductwork, and having at least one conditioning means to provide at least one conditioning treatment selected from the group consisting of heating, cooling and compressing air, and having egress ductwork connected thereto for return of treated air into said cabin;
    (b.) an ionic oxygen generator connected to one of said ingress ductwork and said egress ductwork, said ionic oxygen generator being of sufficient capacity to generate at least 200 ions of ionic oxygen per cubic centimeter of incoming air for removal of airborne contaminants, ozone reduction, and removal of odor from exiting air and wherein ionized oxygen continues to be active within the cabin to further treat the air.

2. The system of claim 1 wherein said ingress ductwork includes an ingress channel of ductwork from an outside environment exterior of said airplane into said airplane for supplying additional oxygen to said cabin.

3. The system of claim 1 wherein said ingress ductwork includes at least one air blower connected thereto.

4. The system of claim 1 wherein said ionic oxygen generator is located within said egress ductwork.

5. The system of claim 1 wherein there is a bypass channel connected to said egress ductwork and there is a valving mechanism adapted to control the flow of air into said bypass channel to thereby control ionic oxygen flow into said air to thereby controllably treat airborne contaminants, ozone and odors.

6. The system of claim 1 wherein said ionic oxygen generator is located within said ingress ductwork.

7. The system of claim 1 wherein there is a bypass channel connected to said ingress ductwork and there is a valving mechanism adapted to control the flow of air into said bypass channel to thereby control ionic oxygen flow into said air to thereby controllably treat airborne contaminants, ozone and odors.

8. An air treatment system for airplanes, which comprises:
    (a.) an environmental conditioning system located within an airplane to provide at least one conditioning treatment selected from the group consisting of heating, cooling, and compressing air, and having ingress ductwork to remove air from a cabin of said airplane and into said environmental conditioning system and having air movement means contained within said environmental conditioning system to remove air from said cabin and into said environmental conditioning system via said ingress ductwork, and having at least one conditioning means to provide at least one conditioning treatment selected from the group consisting of heating, cooling and compressing air, and having egress ductwork connected thereto for return of treated air into said cabin;
    (b.) at least one ionic oxygen generator connected to one of said ingress ductwork and said egress ductwork, said ionic oxygen generator being of sufficient capacity to generate at least 200 ions of ionic oxygen per cubic centimeter of incoming air for removal of airborne contaminants, ozone reduction and removal of odor from exiting air and wherein ionized oxygen continues to be active within said cabin to further treat the air, said at least one ionic oxygen generator having at least a power generator and an ionization creating component selected from the group consisting of elongated cylindrical ionization tubes and flat ionization discs.

9. The system of claim 8 wherein said ingress ductwork includes an ingress channel of ductwork from an outside environment exterior of said airplane into said airplane for supplying additional oxygen to said cabin.

10. The system of claim 8 wherein said ingress ductwork includes at least one air blower connected thereto.

11. The system of claim 8 wherein said ionic oxygen generator is located within said egress ductwork.

12. The system of claim 8 wherein there is a bypass channel connected to said egress ductwork and there is a valving mechanism adapted to control the flow of air into said bypass channel to thereby control ionic oxygen flow into said air to thereby controllably treat airborne contaminants, ozone and odors.

13. The system of claim 8 wherein said ionic oxygen generator is located within said ingress ductwork.

14. The system of claim 8 wherein there is a bypass channel connected to said ingress ductwork and there is a valving mechanism adapted to control the flow of air into said bypass channel to thereby control ionic oxygen flow into said air to thereby controllably treat airborne contaminants, ozone and odors.

15. An air treatment system for airplanes, which comprises:
    (a.) an air treatment system located within an airplane, which incudes at least one air circulation mechanism to move air within said airplane past at least one ionic oxygen generator; and,
    (b.) at least one ionic oxygen generator physically located within said airplane and sufficiently near said at least one air circulation mechanism to have air move past said at least one ionic oxygen generator, said at least one ionic oxygen generator being of sufficient capacity to generate at least 200 ions of ionic oxygen per cubic centimeter of incoming air for removal of airborne contaminants, ozone reduction and removal of odor from existing air and wherein ionized oxygen continues to be active within said cabin to further treat the air, said at least one ionic oxygen generator having at least a power generator and at least one individual ionization creating component.

16. The system of claim 15 wherein said at least one ionic oxygen generator has at least a power generator and at least one individual flat ionization disc.

17. The system of claim 16 wherein there are a plurality of said individual flat ionization discs.

18. The system of claim 15 wherein said at least one ionic oxygen generator has at least a power generator and at least one elongated cylindrical ionization tube.

19. The system of claim 18 wherein there are a plurality of elongated cylindrical ionization tubes.

20. The system of claim 18 wherein there is a plurality of said ionic oxygen generators.

* * * * *